May 4, 1943. R. W. BENFER 2,318,138
SOUND RECORDER MONITORING MEANS
Filed Oct. 19, 1940
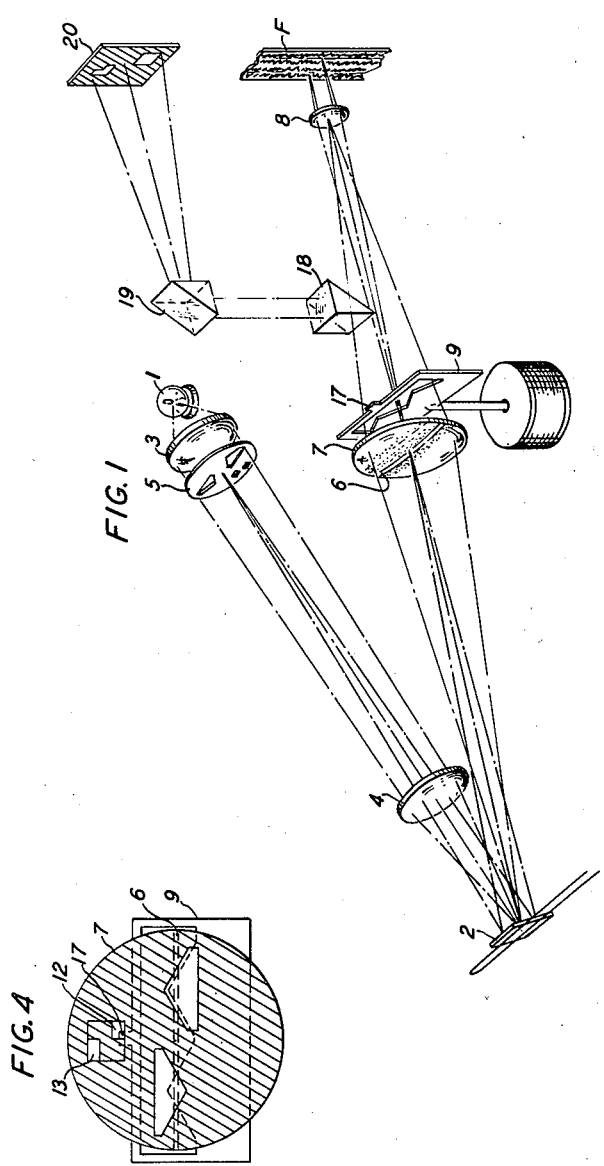
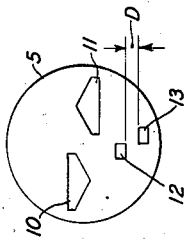
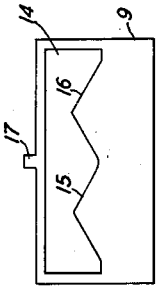
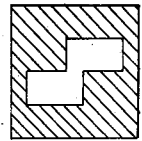
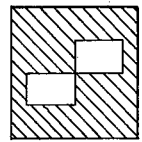
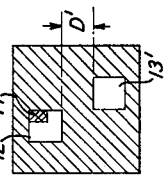
INVENTOR
R. W. BENFER
BY
G. H. Heydt
ATTORNEY Patented May 4, 1943

2,318,138

UNITED STATES PATENT OFFICE 2,318,138

SOUND RECORDER MONITORING MEANS

Richard W. Benfer, Los Angeles, Calif., assignor to Western Electric Company, Incorporated, a corporation of New York Application October 19, 1940, Serial No. 361,880

4 Claims. (Cl. 179—100.3)

This invention relates to sound film recording optical systems and more particularly to improvements in visual monitoring means employed in such systems.

The object of the invention is to provide an improved visual monitoring system in which a readily observable indication of the percentage of modulation of the recording light beam is projected on a visual monitoring screen.

A feature of the invention resides in the provision of means in a recording optical system producing two laterally offset monitoring light beams displaced in the direction of vibration of the beam a distance equal to the displacement of the recording light beam for a peak amplitude signal wave corresponding to one hundred per cent modulation of the recording light beam.

In visual film monitoring systems now used in recording systems employing a vibrating mirror as a light modulating device, there is provided a mask having a recording aperture and a monitoring aperture. The light beams defined by these apertures are modulated in accordance with sound currents by the vibrating mirror and the light beam defined by the monitoring aperture is deflected to a visual monitoring screen. The operator observes the swing of the light beam over a path on the screen and by means of accurately located lines set on the screen at one hundred per cent modulation, is able to determine the point of overload. In the systems used heretofore, the monitoring optical elements must be carefully adjusted with respect to the screen prior to operation of the recording device to insure that the light beam and the line on the screen coincide in one hundred per cent modulation of the beam. It is extremely difficult to obtain the adjustments necessary to insure accurate indications. Even after such adjustment and during operation of the recording system the operator must give a great deal of his attention to the monitoring screen to be able to detect the point of over-modulation of the recording system.

In accordance with this invention the mask containing the aperture defining the recording light beam is provided with two opposed, laterally offset monitoring apertures having their opposed edges separated in the direction of movement of the recording light beam a distance equal to the distance covered by the total swing of the vibrating mirror at one hundred per cent modulation. No indicating marks on the screen are necessary and therefore no precise adjustment of the screen with respect to the monitoring optical system is required as the two monitoring beams moving in opposite directions give their own indication of one hundred per cent and over-modulation on the monitoring screen. The monitoring beams swing over the screen in separate adjacent paths and as they are separated at "rest" by a distance equal to the displacement of the recording light beam for the total swing of the mirror at one hundred per cent modulation, the opposing edges of the two beams will coincide at the point of one hundred per cent modulation and will overlap at the point of overload. The extent of overload may be readily observed by the amount of overlap of the two monitoring light beams.

These and other features of the invention will become more apparent from the following description when read in connection with the accompanying drawing in which:

Fig. 1 is a schematic of the optical system employed in the sound recording system of the invention;

Fig. 2 is an enlarged view of the apertured mask defining the recording and monitoring light beams;

Fig. 3 is an enlarged view of the noise reduction shutter of the recording system;

Fig. 4 is a view showing the optical cooperation between mask, slit and noise reduction shutter;

Fig. 5 is a view of the monitoring screen at a "rest" period of the recording system;

Fig. 6 is a view of the monitoring screen at one hundred per cent modulation of the light beam; and Fig. 7 is a view of the monitoring screen during "overload" of the recording system.

Referring to Fig. 1, I indicates a lamp for producing a constant intensity light. An image of the lamp filament is formed on a vibrator mirror 2 by a condenser lens 3 and relay lens 4. An apertured mask 5 is located near the condenser lens and is focused on a slit 6 by the relay lens 4. The slit 6 is formed by engraving in the silvered surface of a thin glass "flat" which is cemented to the rear plane surface of collective lens 7. This collective lens 7 forms an image of the lamp filament in an objective lens 8 which images the slit on film F. A noise reduction shutter 9 is mounted close to the slit 6 on lens 7.

As shown more clearly in Fig. 2, the mask 5 has two oppositely disposed triangular apertures 10 and 11 which define the recording light beam. While applicant discloses the oppositely disposed triangular apertures for recording a push-pull sound track on the film F, it is to be understood that the monitoring system to be described hereafter will operate equally well with a single recording aperture for indicating the percentage of modulation of a single recording light beam. The mask 5 is further provided with two monitoring apertures 12 and 13. These apertures are laterally offset on opposite sides of the vertical center line of the mask 5 and their opposed horizontal edges are vertically spaced a distance D which is equal to the distance covered by the total swing of mirror 2 for one hundred per cent modulation.

Referring to Fig. 3, the noise reduction shutter 9 is provided with an aperture 14 having two triangular noise reduction masks 15 and 16 which extend into the light beam formed by apertures 10 and 11, respectively, in mask 5. A projection 17 is provided at the top of shutter 9 and extends into the light beam defined by aperture 12 which is imaged at the slit 6.

Fig. 4 discloses the image of the mask 5 on the collective lens 7 and the relation of the images of apertures 10 and 11 with respect to slit 6 during the "rest" period of the recorder. The masks 15 and 16 of shutter 9 are shown in their proper relation to the slit 6 during the "rest" period. The apertures 12 and 13 are imaged at the top of the lens 7 in an area thereof not covered by the silvered glass slit plate cemented to this lens.

In the recording system a periscope device is provided and includes a deflecting prism 18 which extends into and deflects the monitoring light beam out of the path of the recording light beam. Further optical means included in the periscope device, such as deflecting prism 19, projects the monitoring light beam onto a monitoring screen 20 producing thereon an enlarged image of these monitoring beams which is readily observable by the operator.

In Fig. 5 the darkened area D', separating the two monitoring beams during the rest period, is equal to the displacement of the recording light beam for total swing of the mirror 2 at one hundred per cent modulation.

At one hundred per cent modulation the monitoring beam 13' travels upward one-half the distance D' during one-half cycle of the signal wave and the monitoring beam 12' then travels downwards one-half the distance D' during the other half cycle of the signal wave producing an image on the screen 20 as shown in Fig. 6 in which the opposed horizontal edges of the two monitoring beams coincide and the dark area D' disappears.

At higher amplitudes the edges pass each other thus giving an instantaneous indication of overmodulation as shown in Fig. 7.

Referring to Fig. 5 the position of the noise reduction mask is indicated by an image of mask 17 in monitoring beam 12'. Its position will be indicated for modulations up to one hundred per cent modulation where it disappears as at high amplitude signal waves the noise reduction mask withdraws from the recording light beam.

What is claimed is:

1. In a sound recording system, means defining a recording light beam and a pair of monitoring light beams, means for oscillating said light beams in accordance with sound currents, said monitoring light beams having an angular separation corresponding to the angle of oscillation of said recording beam for a peak amplitude signal wave at one hundred per cent modulation, said monitoring light beams being offset in the direction at right angles to the direction of oscillation of said beams.

2. A sound film recording system including an apertured mask for defining the shape of a beam of light, said mask being provided with a recording aperture and a pair of monitoring apertures vertically disposed a distance equal to the height of the recording aperture in said mask.

3. A sound film recording optical system including a mask for defining the shape of a beam of light, said mask being provided with a recording aperture and a pair of laterally offset, vertically separated monitoring apertures.

4. In combination in a sound recording system, a source of light, a mirror responsive to sound currents for oscillating said light, a mask disposed between said light source and said mirror, said mask having an aperture defining a recording light beam and a pair of apertures defining two monitoring light beams, the monitoring apertures in said mask being separated in the direction of oscillation of said mirror a distance equal to the height of the recording beam defining aperture, and means for projecting an image of said monitoring apertures to a viewing screen.

RICHARD W. BENFER.